United States Patent
Sono

(10) Patent No.: US 7,948,563 B2
(45) Date of Patent: May 24, 2011

(54) APPARATUS AND METHOD FOR AUTOMATICALLY ADJUSTING LUMINANCE

(75) Inventor: Koichi Sono, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 983 days.

(21) Appl. No.: 10/303,054

(22) Filed: Nov. 25, 2002

(65) Prior Publication Data

US 2003/0107682 A1 Jun. 12, 2003

(30) Foreign Application Priority Data

Dec. 11, 2001 (KR) ................................ 2001-78178

(51) Int. Cl.
*H04N 5/57* (2006.01)
(52) U.S. Cl. ........ 348/687; 348/688; 348/673; 348/678; 348/674; 382/272; 382/274; 358/520
(58) Field of Classification Search .................. 348/673, 348/672, 687, 688, 675, 678, 674, 677, 255, 348/257; 382/274, 272, 263, 168, 169; 358/520, 358/522, 3.27, 447
See application file for complete search history.

(56) References Cited

U.S. PATENT DOCUMENTS

| | | | | |
|---|---|---|---|---|
| 4,980,756 A * | 12/1990 | Lagoni | ........................... | 348/675 |
| 5,191,420 A * | 3/1993 | Lagoni et al. | ................ | 348/687 |
| 5,432,566 A * | 7/1995 | Tanaka et al. | ................. | 348/687 |
| 5,504,538 A * | 4/1996 | Tsujihara et al. | ............. | 348/673 |
| 5,724,456 A * | 3/1998 | Boyack et al. | ................. | 382/274 |
| 5,808,697 A * | 9/1998 | Fujimura et al. | .............. | 348/672 |
| 6,049,626 A * | 4/2000 | Kim | ............................. | 382/167 |
| 6,600,519 B1* | 7/2003 | Hwang | ........................ | 348/673 |
| 6,870,576 B2* | 3/2005 | Park | ............................. | 348/673 |

FOREIGN PATENT DOCUMENTS

| | | |
|---|---|---|
| JP | 05-227496 | 9/1993 |
| JP | 07-143515 | 6/1995 |
| JP | 9-65252 A | 3/1997 |
| JP | 2001-027890 | 1/2001 |

* cited by examiner

*Primary Examiner* — Jefferey Harold
*Assistant Examiner* — Jean W Désir
(74) *Attorney, Agent, or Firm* — Sughrue Mion, PLLC

(57) ABSTRACT

Provided are an apparatus and method for automatically adjusting luminance, and more particularly, apparatus and method for automatically adjusting luminance per region in plurality of luminance regions of an image to be displayed according to its average luminance value. An average luminance of an image is detected, and then contrast and brightness of image is automatically adjusted according to detected average luminance. Amplification of contrast and brightness is increased to brighten an image in an image with low luminance and reduced to suppress image dazzle in an image with high luminance, thereby providing user with an image of appropriate brightness, irrespective of original brightness. It is possible to prevent diversion of image by dividing its luminance level into a plurality of regions and controlling contrast and luminance per region. Further, a buffer region between luminance regions prevents flickering of image on a screen due to diversion of an adjustable gain.

9 Claims, 5 Drawing Sheets

APPARATUS AND METHOD FOR AUTOMATICALLY ADJUSTING LUMINANCE

CROSS-REFERENCE TO RELATED APPLICATIONS

This application is based upon and claims priority from Korean Patent Application No. 2001-78178 filed Dec. 11, 2001, the contents of which are incorporated herein by reference.

BACKGROUND OF THE INVENTION

1. Field of the Invention

The present invention relates to an apparatus and method for adjusting luminance, and more particularly, to an apparatus and method for automatically adjusting the luminance per region in a plurality of luminance regions of an image to be displayed, according to its average luminance value.

2. Description of the Related Art

As shown in FIG. 1, a general digital display apparatus displays weighted and time-shared image signals corresponding to bits of an image in chronological order, and represents a luminance difference between images, using integral values of these image signals. In other words, a dark image is displayed using only a low-weighted D0-D2 bit, and a light image is displayed by appropriately using a D0-D7 bit.

The general digital display apparatus is disadvantageous, however, in that an image may be displayed to be darker than expected in a case where the response speed of the general digital display apparatus does not come up to a predetermined level. This is because the display period of the image terminates before the luminance of the input image signal sufficiently increases with regard to a bit value, and thus, the image cannot be appropriately displayed.

Also, in general, an analog display apparatus, which uses conventional liquid crystal devices, has non-linear electro-optical characteristics as shown in FIG. 2. This non-linearity can be compensated for to a certain degree, using a gamma correction technique. However, a difference of contrast for a very dark portion or very light portion of an image is small with regard to a variation of applied voltage, and compensation cannot be sufficiently performed for a very dark or light portion. Therefore, the luminance of the image is displayed too darkly in the dark portion, whereas it is displayed too lightly in the light portion.

SUMMARY OF THE INVENTION

To solve the above-described problems, it is an object of the present invention to provide an apparatus and method for automatically adjusting the luminance of a display image by automatically and individually adjusting the contrast and brightness of a plurality of predetermined luminance level regions according to an average luminance value.

Accordingly, to achieve the above object, there is provided an apparatus for automatically adjusting the luminance of an image signal, the apparatus including a luminance operator for calculating the mean values of the red, green, and blue components, and the maximum luminance level of an image to be displayed; a luminance level region decision unit for dividing a luminance level into a plurality of luminance regions, using the maximum luminance level, and determining which luminance region the calculated average luminance value corresponds to; and an automatic luminance controller for controlling the amplification of the luminance level according to the luminance region determined by the luminance level region decision unit.

To achieve the above object, there is also provided a method of automatically adjusting luminance of an image signal, the method including (a) calculating an average luminance value of an image to be displayed; (b) dividing a luminance level into a plurality of luminance regions, and detecting which luminance region the average luminance value, which is calculated in step (a), corresponds to; and (c) controlling the amplification of the luminance level according to the luminance region detected in step (b).

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
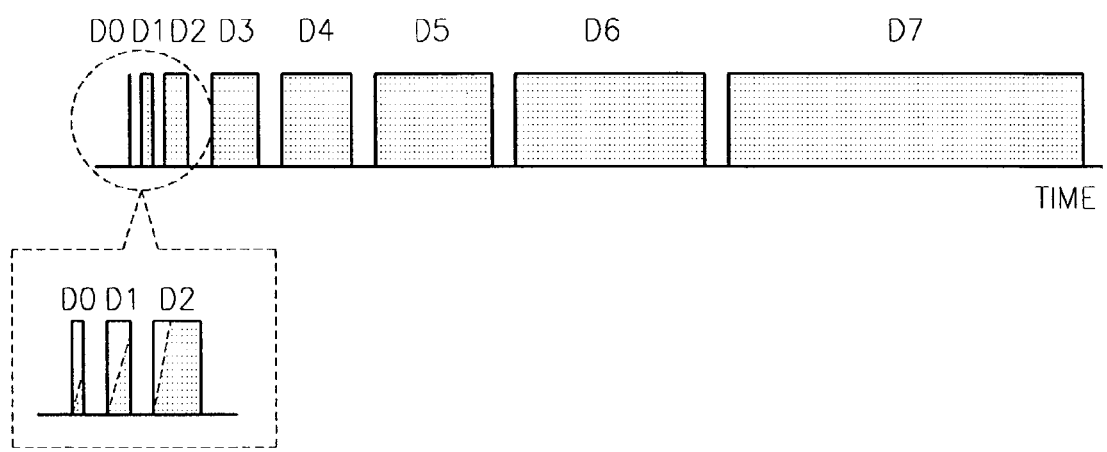
FIG. 1 is a view explaining the deterioration in luminance of an image when using a time-shared display method performed by a general digital display apparatus.
Figure 2:
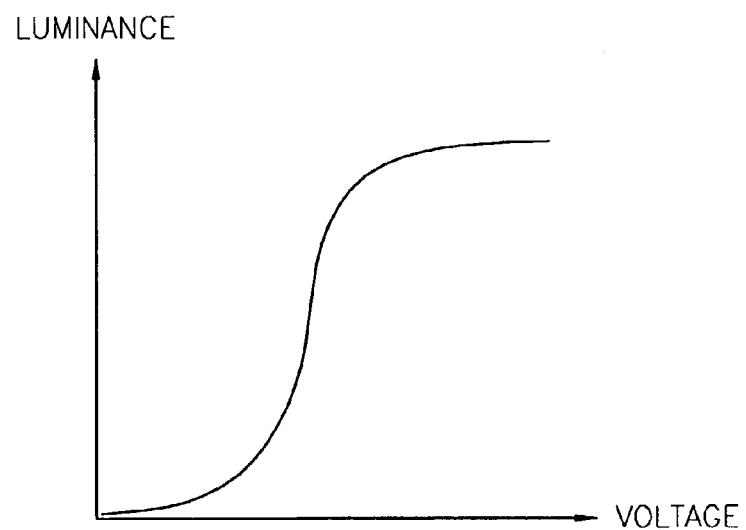
FIG. 2 is a graph illustrating the electro-optical characteristics of a general analog display apparatus.
Figure 3:
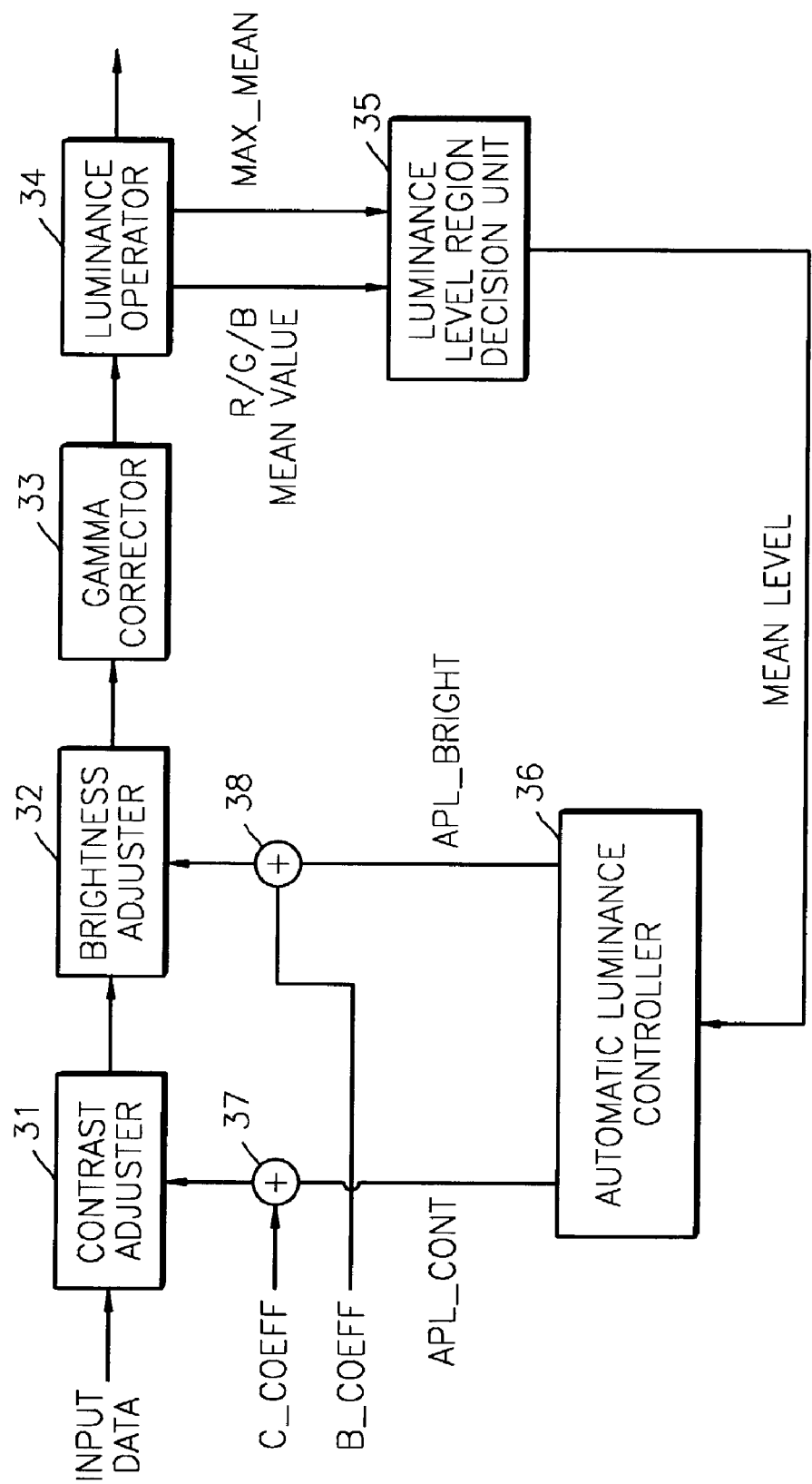
FIG. 3 is a block diagram of an apparatus for automatically adjusting the luminance of an image, according to the present invention.

Referring to FIG. 3, an automatic luminance adjusting apparatus according to the present invention includes a contrast adjuster 31, a brightness adjuster 32, a gamma corrector 33, a luminance operator 34, a luminance level region decision unit 35, an automatic luminance controller 36, and first and second adders 37 and 38.

Hereinafter, the signal processing of an image signal output from a data input terminal using an apparatus and method for automatically adjusting the luminance of an image, according to the present invention, will be described.

The contrast adjuster 31 determines a difference in level between a black level and a white level of an image according to a contrast coefficient C_COEFF that is set by a user. The brightness adjuster 32 determines a reference level voltage according to a brightness coefficient B_COEFF that is set by the user. With the predetermined coefficients, the contrast and brightness of the image are controlled and then, signal processing, which linearizes non-linear optical characteristics of liquid crystal devices, is performed on the image signal by the gamma corrector 33.

Next, when the signal-processed image signal is input to the luminance operator 34, the luminance operator 34 divides the luminance values of an image signal, which belongs to one video field over the whole image or an image within a range set by the user, into R(red), G(green), and B(blue) components, and then integrates them. The integration result comes out as three signals, i.e., R_MEAN, G_MEAN, and B_MEAN, and these signals are input to the luminance level region decision unit 35. At the same time, a maximum luminance integral value MAX_MEAN, which is generated when the color of the image becomes white, is calculated and input to the luminance level region decision unit 35.

Figure 4:
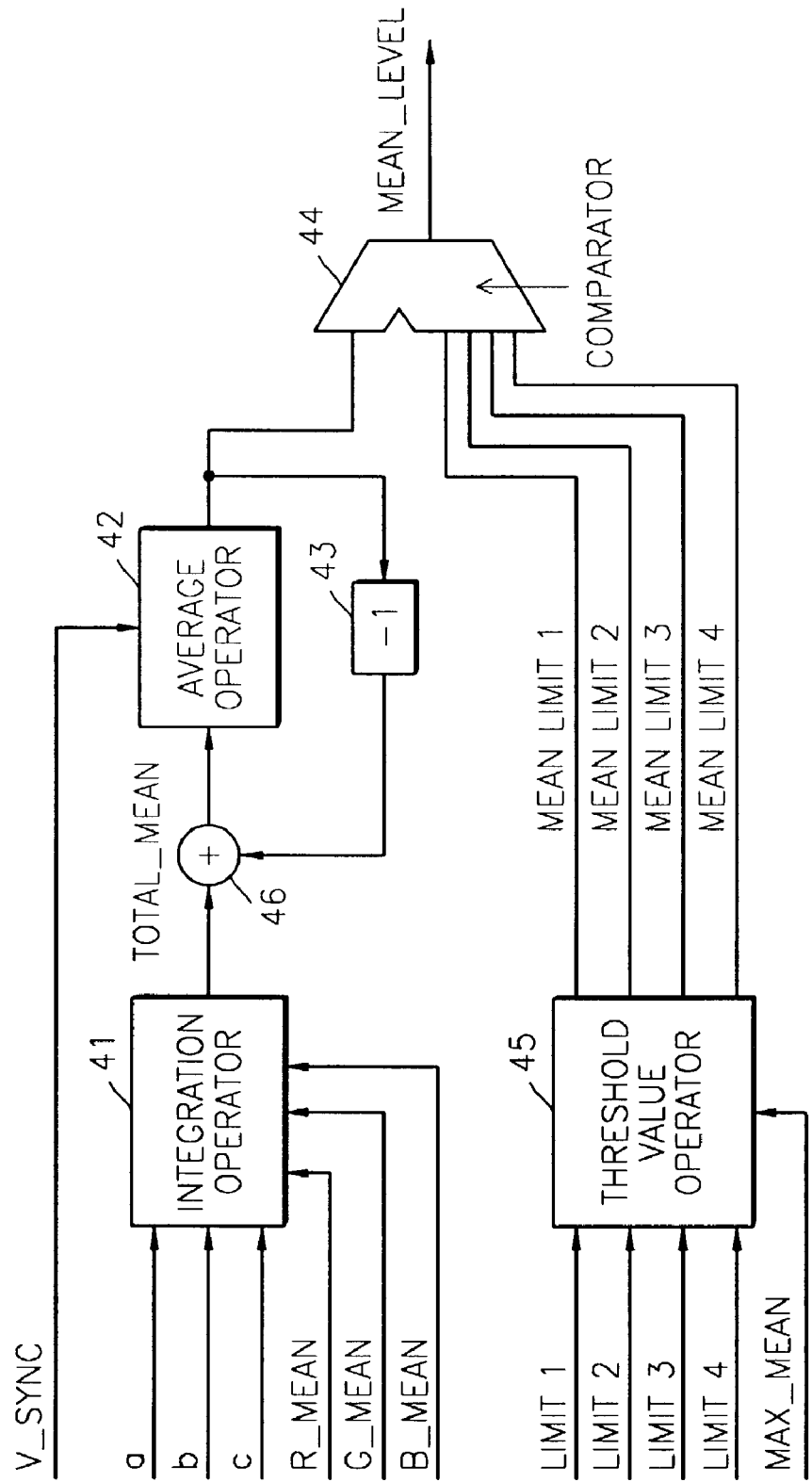
FIG. 4 is a block diagram of a luminance level region decision unit shown in FIG. 3.

FIG. 4 is a block diagram of the structure of the luminance level region decision unit 35. Referring to FIG. 4, the luminance level region decision unit 35 includes an integration operator 41, an average operator 42, a delay buffer 43, a comparator 44, a threshold value operator 45, and an adder 46.

The integration operator 41 receives the signals R_MEAN, G_MEAN and B_MEAN from the luminance operator 34 and calculates an average luminance value TOTAL_MEAN of R, G, and B using the following equation:

$$TOTAL\_MEAN = a \times R\_MEAN + b \times G\_MEAN + c \times B\_MEAN \qquad \text{(Equation 1)}$$

wherein a, b, and c are integers a user sets arbitrarily, and the sum of a, b, and c is 1, i.e., a+b+c=1. The average luminance value TOTAL_MEAN, which corresponds to a result of adjusting the color balance of an integral value, is calculated by Equation 1 and input to the average operator 42.

The average operator 42 performs an average operation for a unit time. More specifically, the average operator 42 counts V_SYNC and calculates an average Mf of the average luminance value TOTAL_MEAN per a unit video field that is arbitrarily set.

The average Mf is obtained by calculating an average value of an average luminance value TOTAL_MEAN per video field, as shown in the following equation:

$$Mf = \frac{1}{n} \sum_{t=0}^{n} M_{t-1} \qquad \text{(Equation 2)}$$

wherein n denotes the total number of fields to be averaged.

Also, the average Mf may be obtained by calculating an average value of an average luminance value TOTAL_MEAN per weighted video field, as shown in the following equation:

$$Mf = \sum_{t=0}^{n} \frac{1}{2^{t+1}} M_{t-1} \qquad \text{(Equation 3)}$$

wherein n denotes the total number of fields to be averaged.

The threshold value operator 45 integrates the maximum luminance integral value MAX_MEAN of an image within a range a user sets arbitrarily, and predetermined four threshold values LIMIT1, LIMIT2, LIMIT3 and LIMIT 4, and outputs four average threshold values MEAN_LIMIT1, MEAN_LIMIT2, MEAN_LIMIT3, and MEAN_LIMIT4 to be compared with an output of the average operator 42.

The comparator 44 compares the output of the average operator 42 with the average threshold values MEAN_LIMIT1, MEAN_LIMIT2, MEAN_LIMIT3, and MEAN_LIMIT4.

Figure 6:
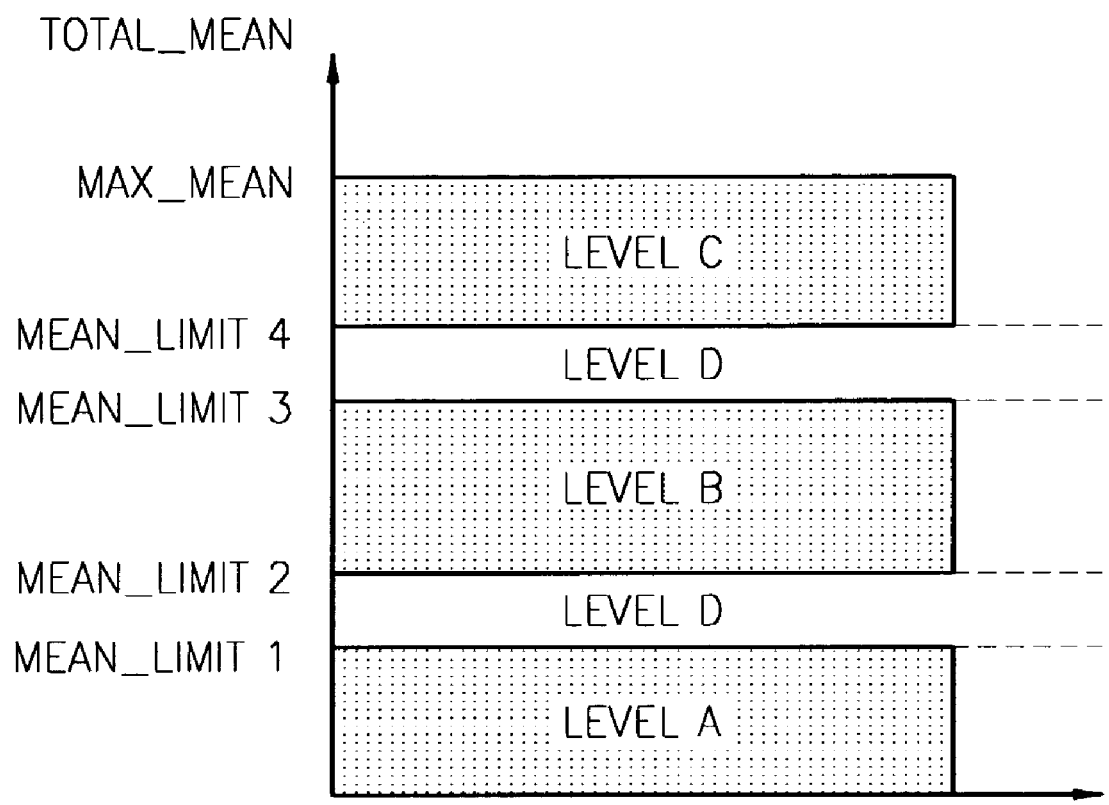
FIG. 6 is a view of a plurality of luminance regions set by a preferred embodiment of an apparatus and method for automatically adjusting the luminance of an image, according to the present invention.

In a preferred embodiment of the present invention as shown in FIG. 6, a luminance level is divided into five regions, i.e., LEVEL=A, LEVEL=B, LEVEL=C, and LEVEL=D, by the average four average threshold values, MEAN_LIMIT1, MEAN_LIMIT2, MEAN_LIMIT3, and MEAN_LIMIT4. More specifically, LEVEL=A, LEVEL=B, LEVEL=C, and LEVEL=D denote a region from 0 to MEAN_LIMIT1, a region from MEAN_LIMIT2 to MEAN_LIMIT3, a region beyond MEAN_LIMIT4, and regions from MEAN_LIMIT1 to MEAN_LIMIT2 and from MEAN_LIMIT3 to MEAN_LIMIT4, respectively. The information regarding each of these regions is output as a signal MEAN_LEVEL.

Here, luminance region LEVEL=D is a buffer region that prevents a rapid change in luminance caused by slight changes between luminance regions.

In this embodiment, a luminance level is divided into the above five regions, but the number of a luminance regions for the luminance level to be divided into, is not restricted in the present invention.

Figure 5:
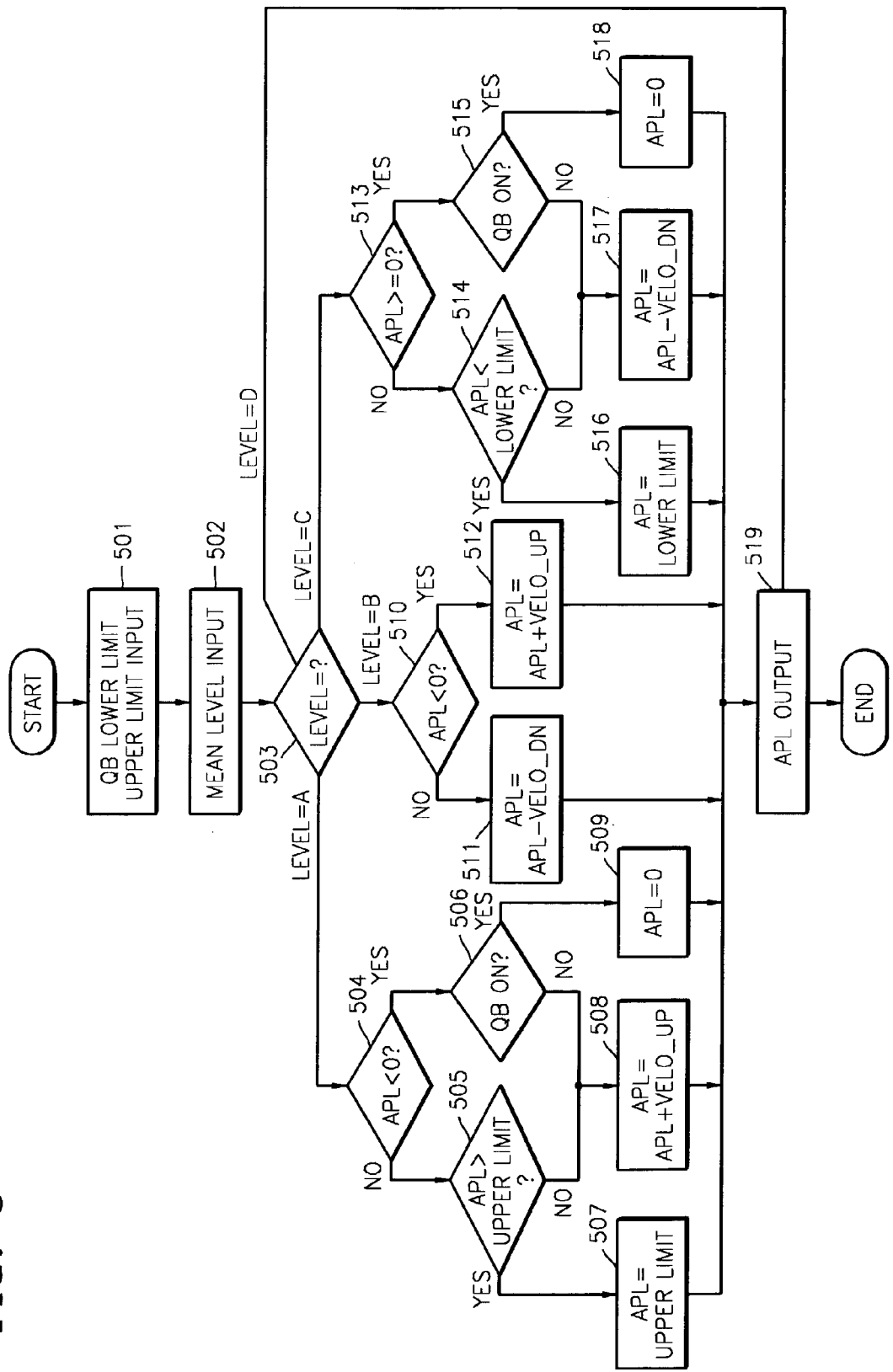
FIG. 5 is a flow chart explaining a method of automatically adjusting luminance of an image, according to the present invention.

The automatic luminance controller 36 performs a control operation as shown in the flow chart of FIG. 5, using the information MEAN_LEVEL regarding the luminance region, which is determined by the luminance level region decision unit 35.

First, a switch signal QB for cancelling automatic luminance control and the upper and lower limits for automatically adjusting luminance are set and input in step 501. Then, the signal MEAN_LEVEL output from the luminance level region decision unit 35 is input to the automatic luminance controller 36 in step 502. Next, the signal MEAN_LEVEL is conditionally branched into paths of MEAN_LEVEL=A, B, C, or D in step 503.

If it is determined in step 503 that MEAN_LEVEL is A, i.e., the average luminance of an image is low, it is checked whether a gain value APL for automatically adjusting the contrast and brightness of the luminance of the image is less than 0, in step 504. The contrast adjuster 31 and the brightness adjuster 32 are operated to increase an amplification factor if the gain value APL is positive and operated to reduce the amplification factor if the gain value is negative.

If it is determined in step 504 that the gain value APL is 0 or positive, it is checked if the gain value APL is above the upper limit or not in step 505. When the gain value APL is above the upper limit, it is set to be fixed to have the upper limit in step 507. This is to limit the gain value APL not to be above an adjustable limit range.

If it is determined that the gain value APL is not larger than the upper limit in step 505, or negative in step 504 and the switch signal QB is set to be switched off by the user, the gain(s) of the contrast and/or brightness of the image is increased according to the following equation in step 508:

$$APL = APL + VELO\_UP \qquad \text{(Equation 4)}$$

wherein VELO_UP denotes an increase in an adjusted gain value.

If it is determined in step 506 that the switch signal QB is switched on, the gain value APL is rapidly reset to be 0 in step 509.

If it is determined in step 503 that the signal MEAN_LEVEL is B, i.e., the image has an appropriate luminance that is not too bright or not too dark, the gain value APL is reset to be 0, thereby displaying the original luminance value of the image.

That is, when it is checked, the gain value APL is controlled to be increased to 0 in step 512 when it is negative in step 510, and controlled to be reduced to 0 in step 511 when it is positive in step 510.

If it is determined in step 503 that the signal MEAN_LEVEL is C, i.e., an average luminance of the image is high and too bright, it is checked whether the gain value APL is larger than or equal to 0 in step 513.

When it is determined in step 513 that the gain value APL is negative, it is checked whether the gain value APL is below the lower limit in step 514. If the gain value APL is less than the lower limit, the lower limit is retained in step 516 in order to limit the gain value APL not to be outside an adjustable limit range.

In the event that it is determined in step 514 that the gain value APL is not less than the lower limit, and in step 513 that the gain value APL is 0 or positive and in step 515 that the switch QB is not turned on, the gain(s) of the contrast and/or brightness of the image is reduced according to the following equation, in step 517:

$$APL=APL-VELO\_DN \qquad (5)$$

wherein VELO_DN denotes a reduction in an adjustable gain value.

If it is determined in step 515 that the QB switch is switched on, the gain value APL is rapidly reset to 0 in step 518.

Lastly, the gain APL is maintained as a middle buffer region if it is determined in step 503 that the signal MEAN_LEVEL is D, i.e., the average luminance of the image MEAN_LEVEL is between A and B or between C and B. This is to prevent the flickering of an image on a screen due to diversion of or fluctuation in an adjustable gain in the upper and lower directions, when there is a slight change in the average luminance between luminance regions.

As described above, the automatic adjustable luminance gain value APL output from the automatic luminance controller 36 is applied to the first and second adders 37 and 38, added with a value for adjusting contrast and luminance of the image, and applied to the contrast adjuster 31 and the brightness adjuster 32 in step 519. As a result, the luminance gain of the image can be adjusted automatically according to luminance regions of an image.

With an automatic adjustable luminance gain, it is possible to control both the contrast and luminance of an image at once, or individually control the contrast and luminance. For instance, a gain is increased to the level of the contrast when an average luminance of the image is dark, thereby making the image comfortable to see, and reduced to the level of the luminance when the average luminance is bright, thereby suppressing image dazzle. Therefore, it is possible to display an image to be comfortable to the eyes of the user by keeping the optimum brightness of the image.

In a preferred embodiment of the present invention, an automatic luminance adjustment level is divided into five regions. However, the number of regions is not restricted, and therefore, the luminance level may be divided into more than or less than five regions. The more regions the luminance level is divided into, the more precisely the luminance of an image is controlled. Also, the luminance of the image can be adjusted by a circuit for adjusting gamma, instead of the contrast and luminance of the image.

As described above, according to the present invention, an average luminance of an image is detected, and then the contrast and brightness of the image is automatically adjusted according to the detected average luminance. Therefore, the amplification of the contract and brightness is increased to brighten an image in an image with low luminance and reduced to suppress image dazzle in an image with high luminance, thereby providing a user with an image of appropriate brightness, irrespective of the original brightness of the image. In particular, it is possible to prevent diversion of the image by dividing its luminance level into a plurality of regions and controlling the contrast and luminance per region. Further, a buffer region between luminance regions prevents the flickering of the image on a screen due to diversion of an adjustable gain.

While this invention has been particularly described with reference to a preferred embodiment thereof, it will be understood by those skilled in the art that various changes in form and details may be made therein without departing from the spirit and scope of the invention as defined by the appended claims.

This invention may be embodied as a method, an apparatus or a system. In a case where the present invention is accomplished by software, code segments for performing indispensable operations are required as constitutional elements. A program or code segments may be stored in a processor-readable medium or be transmitted via a transmitting apparatus or network in response to a computer data signal that is combined with a carrier wave. Here, the processor-readable medium may be any medium capable of storing or transmitting data, e.g., an electronic circuit, a semiconductor memory device, a ROM, a flash memory, an EEPROM, a floppy disk, an optical disc, a hard disc, an optical fiber medium, and a radio-frequency (RF) net. Also, the computer data signal may be any signal that can be transmitted over a transmission medium such as an electronic net channel, an optical fiber, air, an electric field, and an RF net.

What is claimed is:

1. An apparatus for automatically adjusting a luminance of an image signal, the apparatus comprising:
   a luminance operator for calculating mean values of R (red), G (green), and B (blue) components and a maximum luminance level of an image to be displayed;
   a luminance level region decision unit for dividing a luminance level into a plurality of luminance regions, using the maximum luminance value, calculating a calculated average luminance value based on the mean values of the R, G, and B components, and determining which luminance region a calculated average luminance value corresponds to; and
   an automatic luminance controller for controlling an amplification of the luminance level according to the luminance region determined by the luminance level region decision unit.

2. The apparatus of claim 1, wherein a buffer region is set between the luminance regions, and the amplification of the current luminance level is maintained in a case where the average luminance value is within the buffer region.

3. The apparatus of claim 1, wherein the luminance operator divides the luminance value of the image signal into R, G and B components in a unit of a field, integrates and calculates mean values R_MEAN, G_MEAN, and B_MEAN of the R, G, and B components, and integrates and calculates the maximum luminance level generated when a color of the image becomes white.

4. The apparatus of claim 1, wherein the luminance level region decision unit comprises:
   an integration operator for receiving mean values R_MEAN, G_MEAN, and B_MEAN and calculating an average luminance value TOTAL_MEAN of R, G, and B in the unit of a field in consideration of color balance;
   an average operator for calculating a field average luminance value Mf of average luminance values of R, G, and B with regard to several predetermined fields;
   a threshold value operator for receiving the maximum luminance level, determining the maximum luminance level as an upper limit of a highest level region, and calculates threshold values that divide the luminance region by a predetermined number between a 0 (zero) level and the maximum luminance level; and
   a comparator for comparing the field average luminance value Mf and the threshold values and detecting which luminance region has the field average luminance value.

5. The apparatus of claim 4, wherein the integration operator calculates the average luminance value TOTAL_MEAN of R, G, and B using a following equation:

$$TOTAL\_MEAN = a \times R\_MEAN + b \times G\_MEAN + c \times B\_MEAN$$

wherein a+b+c=1.

6. The apparatus of claim 4, wherein the field average operator calculates the field average luminance value Mf using a following equation:

$$Mf = \frac{1}{n}\sum_{t=0}^{n} M_{t-1}$$

wherein n denotes a total number of fields to be averaged.

7. The apparatus of claim 4, wherein the field average operator calculates the field average luminance value Mf by using a following equation:

$$Mf = \sum_{t=0}^{n} \frac{1}{2^{t+1}} M_{t-1}$$

wherein n denotes a total number of fields to be averaged.

8. The apparatus of claim 1, wherein the amplification of the luminance level is for brightness and contrast.

9. A method of automatically adjusting luminance of an image signal, the method comprising:

(a) calculating an average luminance value of an image to be displayed;

(b) dividing a luminance level into a plurality of luminance regions, and detecting which luminance region the average luminance value, which is calculated in step (a), corresponds to; and (c) controlling an amplification of the luminance level according to the luminance region detected in step (b), wherein a buffer region is set between the luminance regions and controls the amplification of a current luminance level to be maintained in case that the average luminance value is within the buffer region.

* * * * *